United States Patent [19]
Knoch et al.

[11] Patent Number: 4,614,724
[45] Date of Patent: Sep. 30, 1986

[54] POLYCRYSTALLINE SINTERED COMPACTS BASED ON EUROPIUM HEXABORIDE AND PROCESS FOR THEIR MANUFACTURE

[75] Inventors: Heinrich Knoch, Waltenhofen-Lanzen; Karl A. Schwetz, Sulzberg; Alfred Lipp, Bad Worishofen; Eckhart Bechler, Kempten, all of Fed. Rep. of Germany

[73] Assignee: Wacker-Chemie GmbH, Munich, Fed. Rep. of Germany

[21] Appl. No.: 562,862

[22] Filed: Dec. 19, 1983

[30] Foreign Application Priority Data

Jan. 20, 1983 [DE] Fed. Rep. of Germany ....... 3301841

[51] Int. Cl.$^4$ .................. C04B 35/56; C04B 35/58; C04B 35/68
[52] U.S. Cl. ........................ 501/87; 501/96; 264/65; 264/332; 252/478
[58] Field of Search ............. 501/87, 96; 264/65, 264/332; 252/478

[56] References Cited

U.S. PATENT DOCUMENTS 4,265,666  5/1981  Contré et al. ................. 501/96

OTHER PUBLICATIONS

Hollenberg et al.; "Hot Pressing of EuB$_6$", Ceramic Bulletin, vol. 60, 1981, pp. 478–480.
Chemical Abstracts, vol. 93, p. 614, No. 56143m, K. A. Schwetz et al. in Ceramurgia International, vol. 5 (1979), pp. 105–109.
Chemical Abstracts, vol. 92, p. 547, No. 30513m, D. E. Mahagin.
Chemical Abstracts, vol. 88, p. 507, No. 160088c, U. Wehmann et al.
G. W. Hollenberg et al. in American Ceramic Society Bulletin, vol. 60 (1981), pp. 478–480.
K. Schwetz et al. in "Atomwirtschaft", vol. 18 (1973), pp. 531–534.
H. Spenke in "Atomwirtschaft", Mar. 1972, pp. 161–164.
E. W. Hoyt et al. in General Electric Report GEA-P-3332, Contract No. AT(04-3)-189, Jun. 6, 1960.
A. E. Pasto et al. in Trans. Amer. Nucl. Soc., vol. 26 (1977), p. 176.

*Primary Examiner*—Mark L. Bell
*Attorney, Agent, or Firm*—Burgess, Ryan & Wayne

[57] ABSTRACT

The invention relates to polycrystalline sintered compact based on europium hexaboride having a density of at least 85% of the theoretical density. The compacts comprise EuB$_6$, from about 0.1 to 10% by weight of B$_4$C and, optionally, amorphous carbon, and have a total of Eu+B+C of at least 98.5% by weight. They have a homogeneous microstructure with mean grain sizes of less than 20 μm, in which, in addition to the crystalline phase EuB$_{6-x}$C$_x$, in which x has values of from 0 to 0.25, B$_4$C can be detected as a separate, finely divided, crystalline phase.

The sintered compacts can be manufactured from powder mixtures comprising europium hexaboride of stoichiometric composition and additions of boron carbide and/or mixtures of a carbon-containing material and a boron component by means of hot pressing in graphite moulds, by means of isostatic hot pressing in casings that can be sealed so that they are gas-impermeable, or by means of pressureless sintering.

16 Claims, No Drawings

POLYCRYSTALLINE SINTERED COMPACTS BASED ON EUROPIUM HEXABORIDE AND PROCESS FOR THEIR MANUFACTURE

It is known that europium hexaboride is of special significance as a neutron-absorbing material for reactors of the "fast breeder" type. Calculations indicate that $EuB_6$ has the following advantages over boron carbide which has preferably been used in nuclear technology:

1. $EuB_6$ with natural B-enrichment has the same reactivity as 35 atom % B-10 enriched $B_4C$;
2. the pressure build-up caused by the formation of helium is 50% lower in $EuB_6$ than in $B_4C$ which has the same reactivity, with the result that its service life is twice as long;
3. the loss of reactivity caused by burn-off is 40% lower in the case of $EuB_6$ than in the case of $B_4C$ (cf. K. A. Schwetz et al in "*Atomwirtschaft und Atomtechnik*", vol 18 (1973), pages 531–534).

BACKGROUND OF THE INVENTION

The manufacture of self-bonded polycrystalline sintered compacts from pulverulent europium hexaboride with a stoichiometric composition which has adequate stability and density for use in nuclear technology is difficult.

Pressureless sintering tests produced discouraging results. In those tests, starting powders having particle sizes of less than 5 μm were predensified without a binder, to form green bodies having from 50 to 60% of the theoretical density (hereinafter % TD) and then heated under vacuum. After 16 hours at sintering temperatures of from 2230° to 2730° C., sintered articles having densities of only 63% TD were obtained. A weight loss of about 40% occurred in the process. At lower sintering temperatures (less than 2230° C.), no densification or shrinkage was observed.

By hot pressing at 2230° C. in vacuo, sintering densities of 90% TD could be obtained although considerable grain coarsening was observed, as well as a reaction between the sintered compact and the graphite mould (cf. E. W. Hoyt et al in *General Electric Report GEAP*-3332, Contract No. AT (04-3)-189, Atomic Energy Commission, June 6, 1960).

Hot pressing at temperatures in the range of from 1850° to 1950° C. produced sintered bodies with densities up to 99% TD. However, a reaction between the sintered compacts and the graphite mould was reported. The resulting sintered compacts were single-phase that is, no secondary phases could be detected. However, they had bimodal grain distribution in the microstructure which comprised a matrix having grain sizes of less than 10 μm surrounded by larger grains of up to 200 μm (cf. A. E. Pasto et al in *Trans. Amer. Nucl. Soc.*, vol. 26 (1977), page 176). In spite of their high density, shaped articles having such a non-homogeneous microstructure are not especially stable.

Further reduction of the sintering temperature to 1700° C. during hot pressing reduced the reaction with the graphite mould and permitted better control of the grain size. However, the lower sintering temperature made the use of submicron $EuB_6$ powder necessary. The submicron $EuB_6$ powder is manufactured by grinding in a tungsten ball mill for 76 hours which is not only uneconomical but introduces contamination into the sintered compact by material abraded during grinding.

It has also been established that the problems encounted during hot pressing are connected with the presence of free europium. This can be rectified by increasing the boron content for example, by adding boron or boron carbide to provide an excess boron phase. Pellets which had been manufactured from a mixture of $EuB_6$ and 5% boron sintered at 1700° C. had a porosity of 8% and had a finer microstructure than did those which had been sintered at 2150° C. under otherwise identical conditions (cf. G. W. Hollenberg et al in *Ceramic Bulletin*, vol 60 (1981), pages 478–480 and report in *Chem. Abs.*, vol 92 (1980), No. 46194 u).

It was only possible to achieve adequate densification of $EuB_6$ powders of stoichiometric composition without adding binders by means of hot pressing. Since hot pressing makes economic sense only if it can be carried out using customary graphite moulds, the possible reactions of $EuB_6$ with C or $B_4C$, and the phase compositions in the ternary system of Eu—B—C, were investigated in detail, In the section $EuB_6$—C, a temperature-dependent, limited solubility of C in the $EuB_6$ lattice was found, with the formation of a crystalline phase corresponding to the formula $EuB_{6-x}C_{x'}$, in which x has values of from 0 to 0.25. Carbon in amounts of more than 3 percent by weight is not soluble in the $EuB_6$ lattice and leads to the formation of additional phases which are sensitive to atmospheric moisture. In the section $EuB_6$—$B_4C$, the above-mentioned crystalline phase was also detected, but no additional phases were found. It is therefore assumed that the section $EuB_6$—$B_4C$ is a pseudobinary system in which these two phases are in equilibrium.

It was concluded from these investigations that when $EuB_6$ powder of stoichiometric composition is subjected to hot pressing in graphite moulds, carburization of the $EuB_6$ takes place with the formation of a solid solution of $EuB_{6-x}C_x$, in which x has the above-mentioned meaning. If, however, at the sintering temperature selected, further carburization beyond the solubility limit of the carbon takes place, the resulting sintered compacts are not resistant to atmospheric moisture due to the presence of europium carbide or boron carbide phases which are sensitive to hydrolysis. However, by maintaining certain conditions, such as avoiding excessively high sintering temperatures during hot pressing and using fine $EuB_6$ powders as the starting material, stable, single-phase $EuB_6$ sintered compacts containing between 0.4 and 0.6 percent by weight of carbon can be obtained (cf. K. A. Schwetz et al in *Ceramurgia International*, vol. 5 (1979), pages 105–109).

In all the known processes, the target has always been the manufacture of self-bonded polycrystalline sintered compacts from $EuB_6$ powder of stoichiometric composition without the addition of binders or sintering aids. The prevailing opinion was that self bonding compacts provided the best properties in the end product. The process, however, had known difficulties such as a high weight-loss, in the case of pressureless sintering, as a result of the formation of volatile europium or europium compounds or excessive carburization caused by reaction with the graphite molds in the case of hot pressing. The reaction with the graphite molds not only necessitates further processing of the resulting sintered compacts but is associated with a large amount of abrasion of the mold so that it cannot be used again. These disadvantages encountered in the case of hot pressing can be kept within limits only by means of extraordinary measures such as accurate temperature control and the use of submicron powders.

The economical production of polycrystalline $EuB_6$ sintered compacts is, however, of great significance for the use of europium hexaboride as a neutron-absorbing material in nuclear technology.

The problem is therefore to provide polycrystalline sintered compacts based on europium hexaboride having properties which are at least as good as those of the known products and which can be obtained without the self-bonding of the $EuB_6$. In addition, the compacts should have the advantage that they can be manufactured not only by means of hot pressing in graphite molds but by means of known sintering processes such as isostatic hot pressing and pressureless sintering, in a simple and economical manner.

BRIEF SUMMARY OF THE INVENTION

The polycrystalline sintered compacts according to the invention, are based on europium hexaboride and have a density of at least about 85% of the theoretically density (% TD) comprise europium hexaboride, from about 0.1 to 10 percent by weight of boron carbide and, optionally, amorphous carbon, and have a total of Eu+B+C of at least about 98.5 percent weight, and have a homogeneous microstructure with mean grain sizes of less than about 20 $\mu$m. In addition to the crystalline phase corresponding to the formula $EuB_{6-x}C_x$, in which x has values of from about 0 to 0.25, boron carbide can be detected as a separate, finely divided, crystalline phase.

The sintered compacts according to the invention can be manufactured from powder mixtures comprising euorpium hexaboride and boron carbide and/or mixtures of a carbon-containing material and a boron component, by sintering, with or without the application of pressure. Amounts of from about 0.5 to 12 percent by weight of boron carbide alone based on the $EuB_6$ powder used, or equivalent amounts of a carbon-containing material and a boron component, are in general sufficient. Carbon can be present in excess.

DETAILED DESCRIPTION OF THE INVENTION

The preferred starting material for the powder mixtures are stoichiometric $EuB_6$ powder (B/Eu=6.0±0.1) and $B_4C$ powder (99.5% by weight of $B_4C$). The particle size of the europium hexaboride powder can be in the range of from about 30 $\mu$m to 3 $\mu$m and finer, depending on the sintering process selected. The boron carbide powder is preferably of submicron fineness. The specific surface area (measured by the BET method) is used as a measure of the particle size. Boron carbide powder having a specific surface area of more than about 18 m²/g, preferably of more than about 20 m²/g, has proved especially suitable for this purpose.

Instead of boron carbide powder per se, however, mixtures of amorphous carbon, or of an organic material which can be coked to form amorphous carbon, and amorphous boron an/or boron carbide can be used.

The sintered compacts, according to the invention, can be manufactured from the mixtures of starting powders with any known sintering processes which are explained individually in detail as follows:
1. Hot pressing:

For this process, relatively coarse-grained $EuB_6$ powder having a maximum particle size of from about 30 $\mu$m to 10 $\mu$m is preferably used as the starting material. The coarse-grained $EuB_6$ powder is relatively reasonably priced and available in a highly pure form.

The $EuB_6$ powder is mixed with the boron carbide powder by known methods to form a homogeneous mixture, and then subjected to hot pressing in a hot press having graphite moulds under a die pressure of approximately 50 MPa at temperatures in the range of from about 1800° to 1900° C. The best results are obtained with the addition of from about 3 to 7% by weight of boron carbide, based on the $EuB_6$ powder used. Densities of more than about 95% TD can be achieved, irrespective of the particle size of the $EuB_6$ powder, at temperatures of about 1850° C.

The theoretically possible density can be calculated according to the mixing rule $$TD = \frac{100}{\frac{\% \text{ by weight of } EuB_{6-x}C_x}{4.91} + \frac{\% \text{ by weight of } B_4C}{2.51}}$$

It is assumed that the formation of the crystalline phase $EuB_{6-x}C_x$ takes place as a result of the reaction of $EuB_6$ with part of the admixed boron carbide. As a result, the formation of $EuB_{6-x}C_x$, reaction of the sintered compact with the graphite mould is virtually completely supprressed and the graphite moulds can thus be used again.

The proportion of crystalline $B_4C$ accompanying phase in the finished sintered compact can be determined indirectly from the difference between the total carbon content and the carbon dissolved in the $EuB_6$ lattice, according to the following equation:

$(C_{total} - C_{lattice}) \times 4.60 = B_4C$ $C_{total}$ = % by weight of total carbon, determined by combustion of the pulverised sample at 1050° C. in a stream of oxygen and coulometric titration of the $CO_2$ formed;

$C_{lattice}$ = % by weight of carbon in the form of a solid solution of $EuB_{6-x}C_x$, determined by measuring the lattice parameters using x-ray diffraction and evaluation according to a calibration diagram;

$B_4C$ = % by weight of boron carbide;

4.60 = stoichiometric factor for conversion of C to $B_4C$ in the case of a natural B-isotope ratio.

2. Isostatic hot pressing:

The starting material can be the same relatively coarse-grained $EuB_6$ powder as used in hot pressing in graphite moulds. The powder can be mixed, until homogeneous, with the finely particulate boron carbide powder.

For the manufacture of the sintered compacts according to the invention, the powder mixture per se can be introduced without further pretreatment into prefabricated casings or capsules of any desired shape and compacted by means of vibration. The casings together with their contents are subsequently evacuated and then sealed so that they are impermeable to gas. The powder mixture can also be preshaped to form green bodies of open porosity that is, with pores open to the surface, and then provided with a gas-impermeable casing. Shaping can be carried out by known methods, for example, by means of die pressing or isostatic pressing at room temperature or at an elevated temperature. After being shaped, the green bodies should have a theoretical density of at least 50%, preferably 60%, based on the theoretically possible density of the mixture.

The casings which are sealed so that they are impermeable to gas, can be made from high-melting point glasses such as pure flint glass or high-melting point ceramics. When the powder mixture per se is used, prefabricated casings or capsules are required. Prefabricated casings can also be used when preshaped green bodies are densified. In the case of preshaped green bodies, the gas-impermeable casing can be formed by means of direct coating, for example, by applying a glass-like or ceramics-like substance which is then melted or sintered forming the gas-impermeable casing. It is advantageous, in addition, to provide an intermediate layer between the glass or ceramic casing and the powder or green body to be densified. For this purpose, there may be used inert powders, fibres or foils as, for example, graphite foil and/or boron nitride powder.

The encased samples are introduced into a high pressure autoclave and heated to the required densification temperature of at least about 1750° C. Argon or nitrogen is preferably used as the inert gas for the transmission of pressure. The gas pressure used is preferably in the range of from about 150 to 250 MPa, which is reached by means of a slow increase at the final temperature used. After the pressure and temperature have been lowered, the cooled compacts are removed from the high-pressure autoclave and freed from the casings for example, by means of sand blasting the glass or ceramic casings.

The best results are obtained by adding from about 1.5 to 3.5% by weight of boron carbide based on the EuB$_6$ powder used, densities of more than about 98%, preferably more than about 99% TD can be achieved with temperatures as low as from about 1750° C. to 1850° C. Not only are the sintered compacts manufactured in this manner virtually free of pores, but, because pressure is applied in all directions, they are virtually free of texture with the result that their properties are not direction-dependent but are constant in all directions.

3. Pressureless sintering:

Relatively fine-grained EuB$_6$ powders having a maximum particle size of about 3 μm and finer are preferably used as the starting material in this process. The EuB$_6$ powder is mixed with the finely divided boron carbide powder to form a homogeneous mixture and then preshaped to form a green body. The shaping can be effected by known methods for example, by die pressing or isostatic pressing at room temperature or at elevated temperature, at a pressure of from about 30 to 600 MPa, preferably of from about 100 to 500 MPa. After being shaped, the green bodies should have a theoretical density of at least about 50%, preferably at least about 60%, based on the theoretical density of the mixture. The preshaped green bodies are then heated in any desired sintering furnace, under vacuum, to temperatures of from about 1450° to 1550° C., and then heated further under an inert gas, under a pressure of about 0.1 MPa, to temperatures of from about 2050° to 2150° C.

An atmosphere of a noble gas such as argon, has proved expecially suitable as the inert gas atmosphere in this process. The pressure is generally atmospheric pressure which is customarily of the order to magnitude of about 0.1 MPa.

In order to achieve adequate densification, the control of the pressure and the sintering atmosphere is of great importance. In order to avoid excessive grain growth, a maximum temperature of about 2150° C. should not be exceeded. Under the conditions indicated, sintering densities of more than 85% TD can be achieved when boron carbide is added, preferably in amounts of from about 3 to 7% by weight. The linear shrinkage of about 15 to 20% associated with pressureless sintering, takes place while the original geometric shape of the green body is retained. There is generally no need for the sintered compacts to be further machined.

It is, however, preferred when carrying out the pressureless sintering process, to use mixtures comprising a carbon-containing material and a boron component instead of boron carbide powder per se. As the carbon-containing material carbon per se, can be used for example, carbon black such as acetylene black, having a specific surface area in the range of from about 10 to 400 m$^2$/g is suitable. It is preferable, however, to use an organic material which can be coked to form carbon at temperatures of up to approximately 1000° C. Examples of suitable organic materials are phenoplasts, and coal-tar pitch; phenol-formaldehyde condensation products, of the novolak and resol types which decompose in the range of from about 100° to 900° C. to form amorphous carbon in a yield of approximately from 35 to 50% are preferred. As the boron component, amorphous boron, boron carbide or mixtures thereof can be used, amorphous boron being preferred.

The carbon-containing material and the boron component are preferably provided in amounts so that approximately equal amounts by weight calculated as free carbon and as free boron are available. The excess carbon, which can be up to three times the carbon content in an equivalent amount of boron carbide, makes it possible to use EuB$_6$ without additional purification. Euorpium hexaboride powder which, as a result of being ground to the requisite particle size of about 3 μm and finer, can have an oxygen content up to about 5% by weight.

For the purpose of homogeneous mixing, the carbon additive, in the form of the organic material, can be dissolved in a solvent and the mixture of EuB$_6$ powder and boron component can be dispersed in the solution. When free carbon is used per se, the EuB$_6$ and the boron component are dispersed together with the elemental carbon in a solution of temporary binder and/or lubricant. Organic solvents such as acetone or lower aliphatic alcohols having from 1 to 6 carbon atoms can be used. The dispersal can be carried out by means of mechanical agitation of a thin suspension in a plastic container or by kneading a thick suspension in a kneading device. The solvent is then removed, for example, in the case of a thin suspension, by spray drying, or in the case of a thick suspension by means of evaporation during the kneading process. Shaping is then carried out to form the green bodies as described above. If the carbon is in the form of an organic material, it is coked in vacuo during the heating process so that at the beginning of the actual sintering process, the carbon is in free form.

Under the above-mentioned conditions of pressure and sintering atmosphere at the temperatures indicated sintered densities of more than about 95%, preferably more than about 98% TD can be achieved when mixtures of carbon and amorphous boron are used in equal amounts by weight, preferably from about 2 to 4% by weight in each case, based on the weight of EuB$_6$ powder used.

In addition to the solid solution of carbon in the $EuB_6$ lattice and the crystalline boron carbide accompanying phase amorphous carbon which can be detected by analysis, is present in the sintered compacts manufactured in this manner. The sintered compacts of the present invention are stable and are not sensitive to atmospheric moisture.

Although there is more carbon available than is necessary for the formation of the solid solution with limited solubility of the carbon in the $EuB_6$ lattice and for the formation of the $B_4C$ accompanying phase from the additional amount of boron, no hydrolysis-sensitive phases were formed. This result must be regarded as unexpected in view of the known fact that in the case of hot pressing of $EuB_6$ powder alone at temperatures of more than 2000° C., reactions with carbon in the graphite moulds provide for the formation of hydrolysis-sensitive phases.

The sintered compacts have a homogeneous microstructure, with a mean grain size of less than about 20 μm. Only a slight grain growth takes place in the process even though pressure, as a control parameter, is absent. The sintered densities achieved are comparable with those which can be obtained by means of isostatic hot pressing of $EuB_6$ powder with a boron carbide additive.

In the following examples, the manufacture of the polycrystalline sintered compacts based on $EuB_6$ according to the invention is set forth:

EXAMPLE 1

Europium hexaboride powder of the following composition was used as starting material:
Eu = 69.8% by weight
B = 29.8% by weight
C = 0.15% by weight
B/Eu = 6.0
total (Eu+B+C) = 99.75% by weight
with a particle size of 10 μm and finer (powder A) and 30 μm and finer (powder B). The boron carbide powder used had a specific surface area of 20 m²/g.

The powders A and B were mixed until homogeneous with 1% by weight and 5% by weight, respectively, of the boron carbide powder, and then subjected to hot pressing at a constant temperature of 1850° C. in graphite moulds under an argon atmosphere and a pressure of 50 MPa to form cylinders 10 mm in diameter and 15 mm in height.

For the purpose of comparison, powders A and B were subjected to hot pressing under the same conditions but without the addition of boron carbide.

Sintering densities of more than 95% TD were achieved at 1850° C. when 5% by weight of boron carbide was added when powders A and B: The % TD was not dependent on the particle size of the europium hexaboride powder used.

Sintering densities of more than 90% TD were achieved when 1% by weight of boron carbide was added and sintering was carried out at the same temperature. The density was independent of the particle size of the europium hexaboride powder used.

The cylinders manufactured according to the invention with the addition of boron carbide can be removed easily from the mould after hot pressing. Virtually no reaction with the graphite moulds was observed and the moulds could thus be re-used.

By comparison, a sintering density of only 63% TD was achieved at 1850° C. with powder A without the addition of boron carbide. Powder B could not be hot pressed at all at 1850° C. without the addition of boron carbide.

EXAMPLE 2

The starting material was europium hexaboride powder of the same composition as in Example I with a particle size of 20 μm and finer. The europium hexaboride powder was mixed with 2% by weight of boron carbide powder having a specific surface area of 20 m²/g and compressed at room temperature in steel moulds to form cylinders 10 mm in diameter and 15 mm in height. The resulting green bodies were introduced into prefabricated flint glass casings and the space between the inside of the casing and the green body was filled with fine particulate boron nitride powder. The casings, together with their contents, were then evacuated and sealed so that they were impermeable to gas. The encased samples were then subjected to hot isostatic densifications at 1800° C. in a high pressure autoclave under an argon gas pressure of 200 MPa. After the densification, the encased samples were cooled and the glass casings were beaten off.

The sintered compacts manufactured in this manner had a density of more than 4.77 g/cm³, and had a total of the components Eu+B+C of 98.74% by weight and a total carbon content of 0.774% by weight.

The carbon dissolved in the crystalline phase $EuB_{6-x}C_x$ was determined at 0.36% by weight, corresponding to the formula $EuB_{5.935}C_{0.065}$, by means of X-ray diffraction precision measurement of the lattice constant. The residual content of 0.414% by weight of carbon corresponds to a content of 1.9% by weight of $B_4C$ in the sintered compact.

If the $EuB_{6-x}C_x$ portion is assumed to be 98.1% by weight, the theoretically possible density can be calculated as follows according to the mixing rule:

$$TD = \frac{100}{\frac{98.1}{4.91} + \frac{1.91}{2.51}} = 4.82 \text{ g/cm}^3.$$

The density of more than 4.77 g/cm³ determined by experiment thus corresponds to 99% TD.

The boron carbide content was determined by means of REM recording as a separate crystalline phase in the form of grains of from 1 to 2 μm in size at the grain boundaries and triple points of th crystalline phase $EuB_{6-x}C_x$ with a mean grain size of approximately 20 μm.

EXAMPLE 3

A $EuB_6$ powder of the following composition was used as the starting material:
Eu = 69.4% by weight
B = 29.6% by weight
C = 0.2% by weight
O = 0.76% by weight
B/Eu = 6.0
total (Eu+B+C) = 99.2% by weight
with a particle size of 3 μm and finer. The boron carbide powder used had a specific surface area of 20 m²/g.

The europium hexaboride power was mixed until homogeneous with 3.5% by weight of boron carbide powder and compressed isostatically in a rubber casing under a liquid pressure of 400 MPa to form a green body 10 mm in diameter and 15 mm in height. The resulting green body was removed from the casing and heated to 1500° C. in a graphite furnace, under vacuum, and maintained at this temperature for 1 hour. The furnace was then flooded with argon and the body heated to 2130° C. under a gas pressure of 0.1 MPa and sintered for 30 minutes until sintering was complete.

The sintered compact manufactured in this manner had a density of 4.30 g/cm$^3$; the total of components Eu+B+C was 99.72% by weight, and the oxygen content was 0.12% by weight.

The carbon dissolved in the crystalline phase EuB$_{6-x}$C$_x$ was determined to be 0.18% by weight. The residual content of 0.34% by weight of carbon corresponds to a content of 1.56% by weight of B$_4$C in the sintered compact.

The theoretically density can be calculated as follows in accordance with the mixing rule:

$$TD = \frac{100}{\frac{98.44}{4.91} + \frac{1.56}{2.51}} = 4.84 \text{ g/cm}^3$$

The density of 4.30 g/cm$^3$ determined by experiment thus corresponds to 88.8% TD.

The low oxygen content in the finished sintered compact can be attributed to the fact that part of the boron carbide powder added has reacted during pressureless sintering with the oxygen present in the starting powder in the form of europium oxide, to form EuB$_6$.

EXAMPLE 4

A europium hexaboride powder of the following composition was used as the starting material:
Eu=66.2% by weight
B=28.3% by weight
C=0.3% by weight
O=5.1% by weight
B/Eu=6.01
total (Eu+B+C)=94.8% by weight
with a particle size of 3 μm and finer. After being ground to the required particle size, the EuB$_6$ powder had a high degree of oxidation.

A commercially available pulverulent phenolformaldehyde resin of the novolak type was used as the carbon-containing additive and amorphous boron was used as the boron component.

The europium hexaboride powder was mixed with 3% by weight of boron and a solution of the novolak powder in acetone in an amount corresponding to approximately 3% by weight of free carbon. The fluid slurry was kneaded in air until virtually all the solvent had evaporated. The powder mixture was then compressed isostatically in rubber casings under a liquid pressure of 400 MPa to form green bodies 10 mm in diameter and 15 mm in height. The resulting green bodies were sintered without pressure under the same conditions as described in Example III.

The sintered compacts manufactured in this manner had a density of from 4.60 to 4.63 g/cm$^3$; the total of the components Eu+B+C was 99.85% by weight and the total carbon content was 3.05% by weight.

The carbon dissolved in the crystalline phase EuB$_{6-x}$C$_x$ was determined to be 1.15% by weight, corresponding to the formula EuB$_{5.79}$C$_{0.21}$.

In order to establish the form in which the remaining carbon is present in the sintered compact, a sintered compact which had been comminuted to a particle size of less than 40 μm was heated to boiling under reflux in 100 ml of dilute nitric acid (50 ml of conc. HNO$_3$+50 ml of H$_2$O). An insoluble residue of 5.81% by weight, based on the total weight of the sintered compact remained.

A carbon content of 32.3% by weight in the insoluble residue, which corresponds to 1.88% by weight, based on the total weight of the sintered compact, was determined by analysis.

From the difference between the insoluble residue and the carbon content, a boron content of 3.93% by weight is found which, when converted, corresponds to 5.02% by weight of boron carbide in the sintered compact, in which 1.09% by weight of the carbon is bonded. The remaining 0.79% by weight of carbon must accordingly be in the form of free amorphous carbon in the sintered compact.

Because of the content of free carbon, the theoretically possible density can be calculated only approximately in accordance with the mixing rule:

$$TD = \frac{100}{\frac{94.98}{4.91} + \frac{5.02}{2.51}} = 4.685 \text{ g/cm}^3$$

The densities of from 4.60 to 4.63 g/cm$^3$ determined by experiment thus correspond to from 98.2 to 98.8% TD.

Only the lines of B$_4$C were found in the acid insoluble residue by means of X-ray diffraction analysis.

We claim:
1. A polycrystalline sintered compact based on europium hexaboride having a density of at least about 85% of the theoretical density of the composition, comprising europium hexaboride, from about 0.1 to 10% by weight of boron carbide having a total of Eu+B+C of at least about 98.5% by weight and having a homogeneous microstructure with a mean grain size of less than about 20 μm, in which, in addition to the crystalline phase corresponding to the formula

$$EuB_{6-x}C_x$$

in which x has values of from 0 to 0.25, boron carbide can be detected as a separate, finely divided, crystalline phase.

2. The compact of claim 1 further comprising amorphous carbon in detectable amounts.

3. A process for the manufacture of the polycrystalline sintered compacts according to claim 1 by means of hot pressing in graphite moulds which comprises:
forming a powder mixture comprising europium hexaboride of stoichiometric composition and at least one additive selected from boron carbide, and a mixture of a carbon-containing material and a boron component wherein the additives are used in amounts of from about 0.5 to 12% by weight of boron carbide based on the weight of europium hexaboride powder, or at least equivalent amounts of mixtures of the carbon-containing material and the boron component, and hot pressing the mixture under a die pressure of at least 50 MPa at a temperature in the range of from about 1800° C. to 1900° C.

4. A process for the manufacture of the polycrystalline sintered compacts according to claim 2 by means of hot pressing in graphite moulds which comprises:
forming a powder mixture comprising europium hexaboride of stoichiometric composition and at least one additive selected from boron carbide, and a mixture of a carbon-containing material and a boron component, wherein the additives are used in amounts of from about 0.5 to 12% by weight of boron carbide based on the weight of europium hexaboride powder, or at least equivalent amounts of mixtures of the carbon-containing material and the boron component, wherein carbon is present in excess, and hot pressing the mixture under a die pressure of at least 50 MPa at a temperature in the range of from about 1800° C. to 1900° C.

5. A process for the manufacture of the polycrystalline sintered compact according to claim 1 by means of isostatic hot pressing using an inert gas as the pressure-transmission medium, which comprises:

providing a powder mixture comprising europium hexaboride, of stoichiometric composition and at least one additive selected from boron carbide, and a mixture of a carbon-containing material and a boron component, wherein the additives are used in amounts of from about 0.5 to 12% by weight of boron carbide based on the weight of europium hexaboride powder, or at least equivalent amounts of mixtures of the carbon-containing material and the boron component, or green bodies preshaped therefrom having a density of at least 50%, of that theoretical density; encasing the powder mixture or green body in a gas-impermeable casing under vacuum,; and subjecting the encased material to isostatic hot pressing under a gas pressure of from about 150 to 250 MPa at a temperature in the range of from about 1750° C. to 1850° C.

6. A process for the manufacture of the polycrystalline sintered compact according to claim 2 by means of isostatic hot pressing using an inert gas as the pressure-transmission medium, which comprises:

providing a powder mixture comprising europium hexaboride, of stoichiometric composition and at least one additive selected from boron carbide, and a mixture of a carbon-containing material and a boron component, wherein the additives are used in amounts of from about 0.5 to 12% by weight of boron carbide based on the weight of europium hexaboride powder, or at least equivalent amounts of mixtures of the carbon-containing material and the boron component, wherein carbon is present in excess, or green bodies preshaped therefrom having a density of at least 50%, of that theoretical density; encasing the powder mixture or green body in a gas-impermeable casing under vacuum,; and subjecting the encased material to isostatic hot pressing under a gas pressure of from about 150 to 250 MPa at a temperature in the range of from about 1750° C. to 1850° C.

7. A process according to claim 3 or 4, wherein the europium hexaboride powder has a maximum particle size of about 30 μm and the boron carbide powder has a specific surface area (measured by the BET method) of more than 18 m²/g.

8. A process according to claim 5 or 6, wherein the europium hexaboride powder has a maximum particle size of about 30 μm and the boron carbide powder has a specific surface area (measured by the BET method) of more than 18 m²/g.

9. A process for the manufacture of the polycrystalline sintered compact according to claim 1 by means of pressureless sintering which comprises:

preshaping a powder mixture comprising europium hexaboride of stoichiometric composition and at least one additive selected from boron carbide, and a mixture of a carbon-containing material and a boron component, wherein the additives are used in amounts of from about 0.5 to 12% by weight of boron carbide based on the weight of europium hexaboride powder, or at least equivalent amounts of mixtures of the carbon-containing material and the boron component, to form a green body having a density of at least about 50% of the theoretical density; heating the preshaped green body under vacuum to a temperature in the range of about 50% of the theoretical density; heating the preshaped green body under vacuum to a temperature in the range of about 1450° C. to 1550° C. and then heating the green body in an inert gas atmosphere under a pressure of 0.1 MPa, to a temperature of from about 2050° C. to 2150° C.

10. A process for the manufacture of the polycrystalline sintered compact according to claim 2 by means of pressureless sintering which comprises:

preshaping a powder mixture comprising europium hexaboride of stoichiometric composition and at least one additive selected from boron carbide, and a mixture of a carbon-containing material and a boron component, wherein the additives are used in amounts of from about 0.5 to 12% by weight of boron carbide based on the weight of europium hexaboride powder, or at least equivalent amount of mixtures of the carbon-containing material and the boron component wherein carbon is present in excess, to form a green body having a density of at least about 50% of the theoretical ensity; heating the preshaped green body under vacuum to a temperature in the range of about 1450° C. to 1550° C. and then heating the green body in an inert gas atmosphere under a pressure of 0.1 MPa, to a temperature of from about 2050° C. to 2150° C.

11. A process according to claim 9, wherein the europium hexaboride powder has a maximum particle size of 3 μm and the boron carbide powder has a specific surface area greater than 18 m²/g.

12. A process according to claim 10, wherein the europium hexaboride powder has a maximum particle size of 3 μm and the boron carbide powder has a specific surface area greater than 18 m²/g.

13. A process according to claim 9, wherein a phenol-formaldehyde condensation product is used as the carbon-containing material and amorphous boron is used as the boron component.

14. A process according to claim 10, wherein a phenol-formaldehyde condensation product is used as the carbon-containing material and amorphous boron is used as the boron component.

15. A neutron-absorbing article comprising the compact of claim 1.

16. A neutron-absorbing article comprising the compact of claim 2.

* * * * *